US008745591B2

(12) United States Patent
De Smet et al.

(10) Patent No.: US 8,745,591 B2
(45) Date of Patent: Jun. 3, 2014

(54) DATA FLOW VISUALIZATION AND DEBUGGING

(75) Inventors: Bart De Smet, Bellevue, WA (US);
Henricus Johannes Maria Meijer, Mercer Island, WA (US)

(73) Assignee: Microsoft Corporation, Redmond, WA (US)

( * ) Notice: Subject to any disclaimer, the term of this patent is extended or adjusted under 35 U.S.C. 154(b) by 69 days.

(21) Appl. No.: 13/277,203

(22) Filed: Oct. 19, 2011

(65) Prior Publication Data

US 2013/0104107 A1 Apr. 25, 2013

(51) Int. Cl.
*G06F 9/44* (2006.01)

(52) U.S. Cl.
USPC ............ 717/125; 717/127; 717/128; 717/130

(58) Field of Classification Search
USPC .................................. 717/124–132
See application file for complete search history.

(56) References Cited

U.S. PATENT DOCUMENTS

| | | | | |
|---|---|---|---|---|
| 6,915,290 | B2 * | 7/2005 | Bestgen et al. | 1/1 |
| 6,944,614 | B1 * | 9/2005 | Ramasamy et al. | 1/1 |
| 7,765,200 | B2 | 7/2010 | Kandil et al. | |
| 7,934,202 | B2 | 4/2011 | Messmer et al. | |
| 2009/0265324 | A1 | 10/2009 | Mordvinov et al. | |
| 2010/0169381 | A1 * | 7/2010 | Faunce et al. | 707/797 |
| 2011/0029485 | A1 | 2/2011 | Park et al. | |
| 2013/0014088 | A1 * | 1/2013 | Park et al. | 717/128 |

OTHER PUBLICATIONS

Microsoft Developer Network, "Expression Trees," MSDN, .NET Framework 3.5 (Released Nov. 19, 2007), last retrieved from http://msdn.microsoft.com/en-us/library/bb397951(v=vs.90).aspx on May 2, 2013.*
Bolazar, et al., "Debugging with Software Visualization and Contract Discovery", Retrieved at <<http://www.ecs.syr.edu/faculty/fawcett/handouts/webpages/..%5CResearch%5CBolazar%5Cpapers%5CDebugging_by_Visualization_and_Contract_Discovery_4pp_v11.pdf>>, Proceedings of the 15th International Conference on Software Engineering and Data Engineering, SEDE , Jul. 6-8, 2006, pp. 47-50.
Troncon, et al., "Analyzing & Debugging ILP Data Mining Query Execution", Retrieved at <<http://citeseerx.ist.psu.edu/viewdoc/download?doi=10.1.1.59.8503&rep=rep1&type=pdf>>, Proceedings of the sixth international symposium on Automated analysis-driven debugging (Aadebug), Sep. 19-21, 2005, pp. 5.
Anand, et al., "Provenance Browser: Displaying and Querying Scientific Workflow Provenance Graphs", Retrieved at <<http://ieeexplore.ieee.org/stamp/stamp.jsp?tp=&arnumber=5447741>>, Proceedings of the 26th International Conference on Data Engineering (ICDE), IEEE , Mar. 1-6, 2010, pp. 1201-1204.
Okamura, et al., "Execution Visualization and Debugging in Three-Dimensional Visual Programming", Retrieved at <<http://ieeexplore.ieee.org/stamp/stamp.jsp?tp=&arnumber=1320140>>, Proceedings of the Eighth International Conference on Information Visualisation, Jul. 14-16, 2004, pp. 167-172.

* cited by examiner

*Primary Examiner* — Wei Zhen
*Assistant Examiner* — Andrew M Lyons
(74) *Attorney, Agent, or Firm* — Nicholas Chen; Kate Drakos; Micky Minhas

(57) ABSTRACT

Computation execution can be visualized and debugged. A computation such as a database query plan graph can be extracted from a database query expression. Trace points can be injected into the database query expression while preserving original behavior. Query graphs can be generated with automatic inserting of mechanisms to connect to trace points, enabling visualization of query execution lifecycle states, collection of data traces across operators, and historical debugging with replay of data sets.

20 Claims, 9 Drawing Sheets

DATA FLOW VISUALIZATION AND DEBUGGING

BACKGROUND

Data is retrieved from a database by querying for it. The query is typically written in a query language that declaratively specifies what is to be retrieved. The query expression is typically processed by a query processor, which determines the query's execution plan, the sequence of steps that will be taken to retrieve the requested data. There can be more than one query plan for a particular query, each returning the same results but having different execution plans. The database server typically chooses the execution plan that is expected to yield the results in the shortest possible time, called query optimization.

Debugging query expressions can be challenging, in part due to the declarative nature of a query expression. As a result, it is hard to visualize the data flowing through different stages of query execution, e.g., filtering, projection, sorting and so on. Moreover, query execution can be deferred, which means that the actual execution of the query can take place at a different time and in a different context than that in which the query is defined.

SUMMARY

The flow of data can be visualized when a computation is executed by instrumenting the computation without altering behavior of the computation. The computation can be captured as a data structure. The data structure derived from the computation can be rewritten to include a trace point call after each source retrieval and operator call operation. Each call can generate one or more events that can be received by an observer to visualize computation state during execution of the computation.

The computation can be a database query expression. The query expression can be captured as an expression tree. A query plan graph can be constructed from the expression tree with nodes of the graph representing intermediate sequences of data and edges of the graph representing query operators. The query plan graph can be visualized in a user interface. The expression tree can be instrumented with trace points that dispatch notifications triggered by the passing of data and other events to an observer such as a debugger or tracer. During execution of the instrumented expression tree created from the query expression, data can be tagged with a trace identifier that identifies the source of the data. A query can be re-executed by caching inputs.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Overview

Exactly what happens when a computation is executing can be difficult to determine. Known tools do not provide a means to visualize the flow of data during execution of a computation or provide the ability to trace the origin of data flowing through the computation. In accordance with aspects of the subject matter described herein, the ability to instrument, visualize and debug a computation is provided.

A computation can be captured in a data structure. A graph can be constructed from the data structure. The computation can be instrumented by adding code for a trace point, a point that dispatches notifications to an observer. Notifications to the observer can be triggered by specified events. The graph can be mapped onto a user interface representation. The observer can provide various visualizations, logging activities and the like based on the received notifications. Data can be traced by tagging the data with an identifier. Following traces from a log can be used to observe which operators have operated upon the data. Data can be cached by injecting code into the computation so that parts of the computation can be rerun using the cached inputs or by using intermediate results.

In accordance with aspects of the subject matter disclosed herein, the computation can be a query expression. The query expression can be a query expression that is being debugged. Within this context, a query expression can be captured as an expression tree, from which an expression graph can be generated. Nodes in the expression graph can correspond to intermediate sequences of data, and edges can correspond to the query operators used in the query expression. Edges can be instrumented by adding code for trace points. When a trace point is encountered, a notification can be sent to a debugger enabling the debugger to execute debugging actions triggered by data passing and other lifecycle events (e.g., stage of a query operator's execution). The query expression graph can be used to derive a user interface representation such as but not limited to a boxes-and-lines diagram. Breakpoints, watch windows, execution visualizers, and other mechanisms can be associated with the lines of the diagram, based on a particular trace point associated with a particular user interface element. To trace data through the graph, code can be inserted that tags data with a trace-specific trace identifier. Following traces from a log can be used to observe operators that have operated upon the data. Code that caches results from a data source or query operator can be injected so that the query expression can be rerun using the cached results. A data source can be any query-able source including but not limited to an XML document, a web service, a database, an object-oriented program, etc.

Data Flow Visualization and Debugging

Figure 1A:
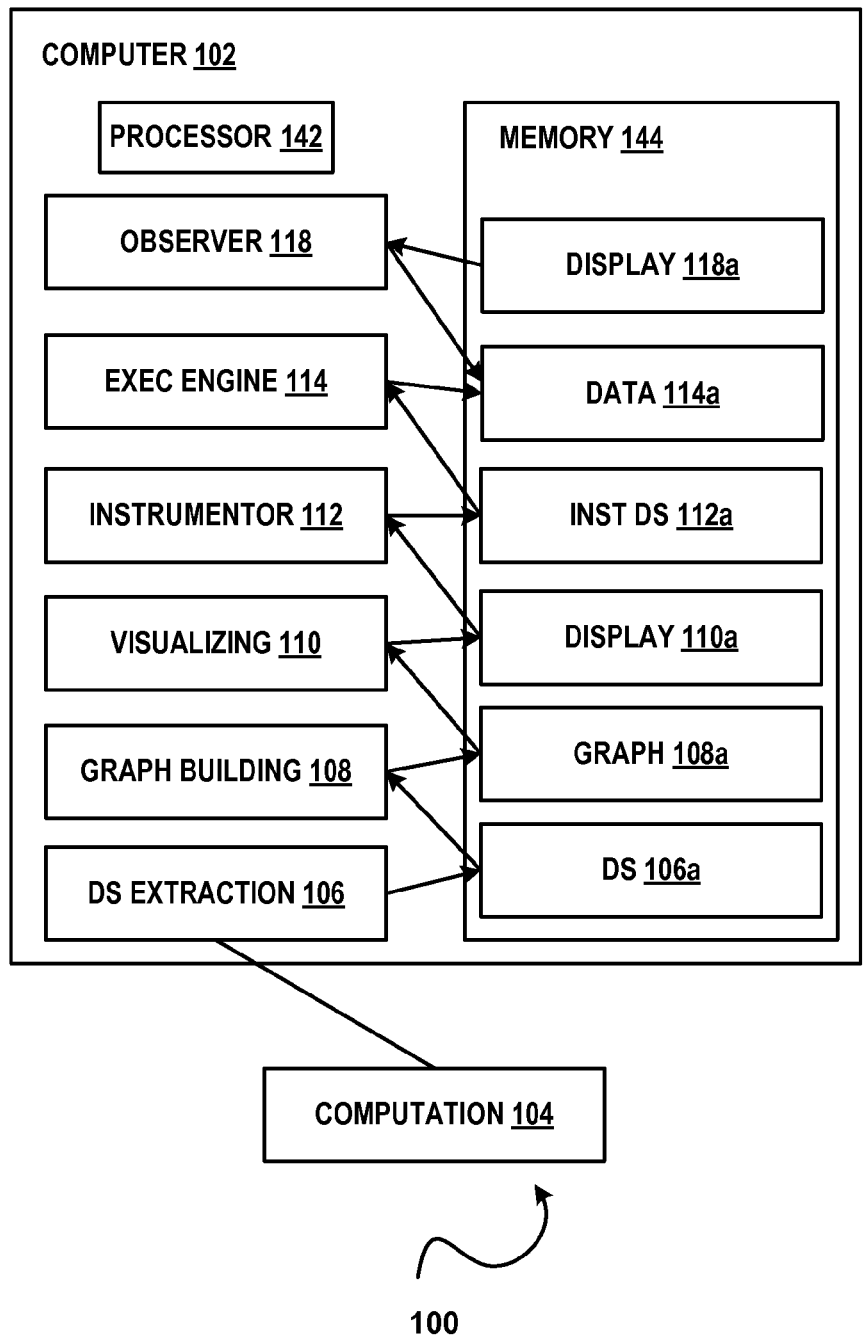
FIG. 1a illustrates an example of a system 100 that provides a visualization of data flow as a computation is executed in accordance with aspects of the subject matter disclosed herein.

FIG. 1a illustrates an example of a system 100 that visualizes computation execution in accordance with aspects of the subject matter disclosed herein. All or portions of system 100 may reside on one or more computers such as the computers described below with respect to FIG. 3. System 100 may execute on a software development computer such as the software development computer described with respect to FIG. 4. System 100 or portions thereof may execute within an IDE or may execute outside of an IDE. The IDE can be an IDE such as the one described with respect to FIG. 4 or can be any other IDE. Alt or portions of system 100 may be implemented as a plug-in or add-on.

System 100 may include one or more computers or computing devices such as a computer 102 comprising: one or more processors such as processor 142, etc., a memory such as memory 144, and one or more modules such as a data structure extraction module 106 that receives a computation 104 and generates a data structure such as data structure 106a from the computation 104, a graph building module 108 that receives the data structure 106a and performs a translation on the data structure 106a into a graph such as graph 108a, a visualizing/logging module 110 that receives a graph 108a generated by the graph building module 108 and generates a visualization such as display 110a or that logs information derived from the graph 108a generated indirectly from the computation 104. System 100 may also include one or more modules such as instrumentor module 112 that inserts code into the computation and/or into the data structure derived from the computation (e.g., instrumented data structure 112a) and/or into the graph derived from the data structure. System 100 may also include one or more modules such as execution engine 114 that executes the instrumented computation, data structure or graph. The results of the execution of the instrumented computation can be data such as data 114a. System 100 may also include one or more modules such as observer module 118 which may provide a display such as display 118a.

Figure 1B:
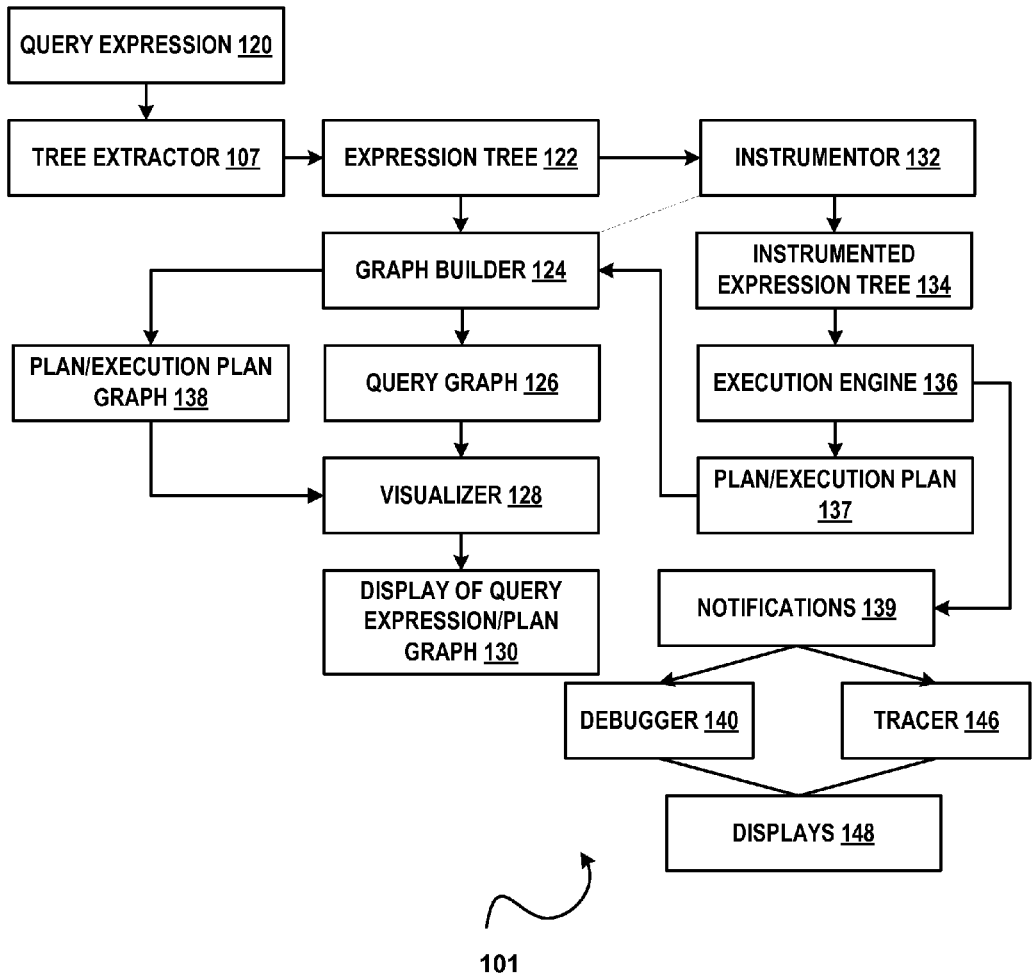
FIG. 1b illustrates an example of a system 101 that provides a visualization of data flow as a query expression is executed in accordance with aspects of the subject matter disclosed herein.

FIG. 1b illustrates an example of a system 101 that visualizes and debugs database query execution in accordance with aspects of the subject matter disclosed herein. All or portions of system 101 may reside on one or more computers such as the computers described below with respect to FIG. 3. System 101 may execute on a software development computer such as the software development computer described with respect to FIG. 4. System 101 or portions thereof may execute within an IDE or may execute outside of an IDE. The IDE can be an IDE such as the one described with respect to FIG. 4 or can be any other IDE. All or portions of system 101 may be implemented as a plug-in or add-on.

System 101 may include one or more computers or computing devices such as a computer (not shown) comprising: one or more processors (not shown), a memory (not shown), and one or more data structure extraction modules such as a tree extractor module 107 that receives a query expression 120 and generates an expression tree 122 from the query expression 120, a graph building module such as graph builder 124 that receives the expression tree 122 and generates a query graph 126 from the expression tree 122. System 101 may include one or more visualizing modules such as visualizer 128 that receives the query graph 126 and generates a display 130 of the query expression 120.

System 101 may also include a instrumentor module such as instrumentor 132 that receives expression tree 122 and generates an instrumented expression tree 134 that can be executed by a query execution engine 136. Query execution engine 136 can include a query processor and/or a query optimizer and can generate a query plan and/or a query execution plan (represented in FIG. 1b by plan/execution plan 137) from which an instrumented query plan graph can be generated and visualized by the visualizer 128 and/or from which an instrumented query execution plan graph 138 can be generated and visualized by the visualizer 128. The execution of the instrumented expression tree and/or resulting instrumented query execution plan graph and/or instrumented query execution plan graph can result in notifications 139 being sent to an observer such as debugger 140, tracer 146, etc. Debugger 140 and/or tracer 146 can provide various displays represented in FIG. 1b by displays 148.

Figure 2A:
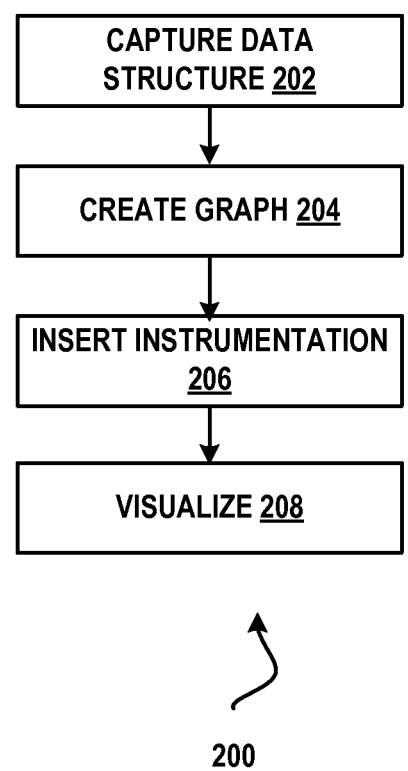
FIG. 2a illustrates an example of a method 200 that provides a visualization of data flow as a computation is executed in accordance with aspects of the subject matter disclosed herein.

FIG. 2a illustrates a method 200 in which the data flow of a computation can be visualized and debugged in accordance with aspects of the subject matter disclosed herein. The method described in FIG. 2a can be practiced by a system such as but not limited to the one described with respect to FIGS. 1a and/or 1b. While method 200 describes a series of acts that are performed in a sequence, it is to be understood that method 200 is not limited by the order of the sequence. For example, some acts may occur in a different order that that described. In addition, an act may occur concurrently with another act. In some instances, not all acts may be performed.

At 202 a computation can be received. The computation can be specified in a programming language expression. The computation can be received and executed by a processor of a computing device. The computation can be converted into a data structure representing the computation. In accordance with aspects of the subject matter described herein, the calculation can be a query expression (e.g., a database query expression). In accordance with aspects of the subject matter described herein, the data structure can be an expression tree or any other suitable data structure. The data structure capturing the computation can be generated by decompiling code. Decompilation of the code can be integrated with tools of an IDE so that changes do not need to be made to the code (e.g., to the query) by, for example, running in a debug build mode and inserting post-compilation instrumentation code.

Alternatively, a computation such as a query can be captured by insertion of code into the computation (e.g., into the query expression). For example, a query expression such as:

from $x$ in $xs$ from $y$ in $ys$ where $x>y$ select $x+y$ can be captured by calling a method that receives the query and captures the entire query as an expression tree. For example, code editors, query debuggers, and the like can emit code that captures query expressions as data structures. The expression:

```
var res=Debug.Query(( )=> from x in xs from y in ys
    where x>y select x+y);
``` returns the query representation in a variable called "res". The query when executed selects values x from a sequence of numbers (xs) and values y from a sequence of numbers y (ys) where x>y and then adds x+y. For example for the sequence of numbers x=0,2,3,4) and the sequence of numbers y=(0,2, 2,4), the use of two from clauses results in the Cartesian product of both sequences being used. 2>0, 3>0, 3>2, 3>2, 4>0, 4>2, 4>2 all pass the predicate, producing results 1, 2, 3, 5, 5, 4, 6, 6. The static type of the variable "res" is the same whether the method Debug.Query is called or is not called. For example, if xs and ys are both of type IEnumerable<int>, the query's result type is an IEnumerable<int> as well. Wrapping the query expression in a call to Debug.Query does not influence (e.g., does not change) the type of the result. The Debug.Query method can have the following signature:

```
static IEnumerable<T> Query<T>
    (Expression<Func<IEnumerable<T>>>query);
```

Figure 2B:
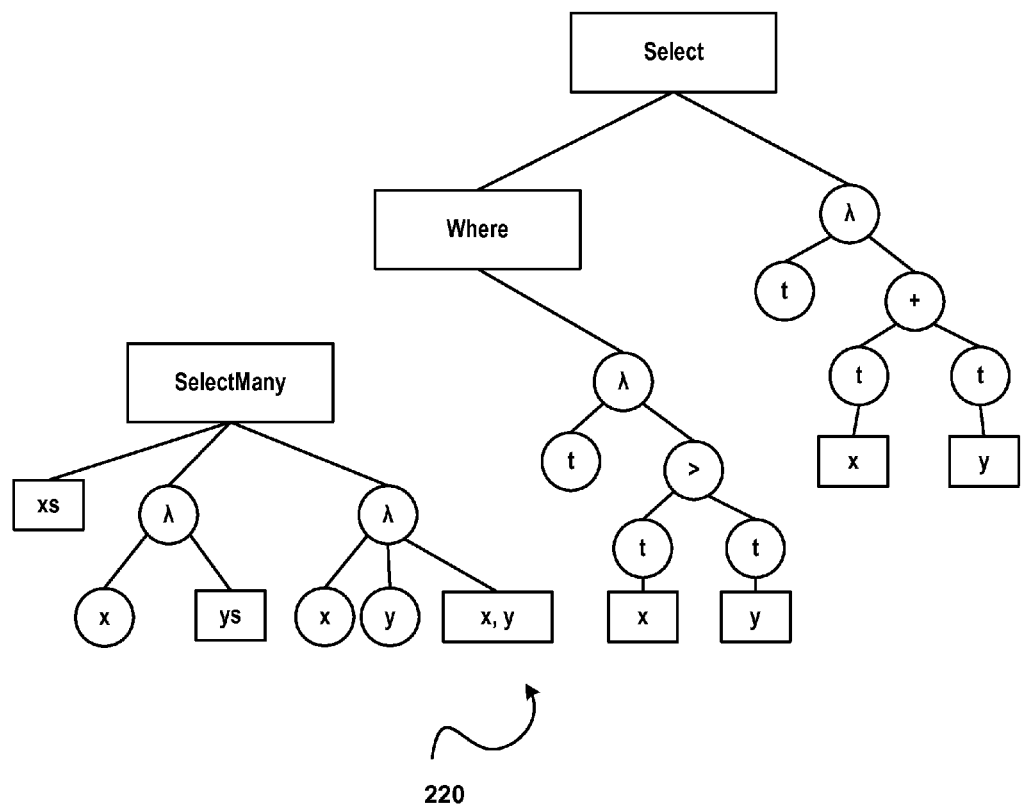
FIG. 2b illustrates an example of an expression tree 220 for a query expression in accordance with aspects of the subject matter disclosed herein.

Use of the Expression type causes assignment to the query parameter with a lambda expression (i.e., an anonymous method, or closure) to be turned into an expression tree that represents all of the operations carried out in the lambda body. This lambda expression takes in no parameters, and returns the query expression in the lambda body. By using an expression tree, the lambda expression is turned into a data representation, capturing the query expression as a data structure that can be rewritten and instrumented. FIG. 2b illustrates an example of a representation of the query expression tree 220 for the sample query:

```
var res=Debug.Query(( )=> from x in xs from y in ys
    where x>y select x+y);
```

Capturing the query expression in this way captures the whole query expression including any sub-query included in the query as a tree. In addition, in accordance with aspects of the subject matter disclosed herein, the dynamic runtime type of the result of the query can include more specificity than can IEnumerable<T>, enabling an Observer such as a debugger visualizer to interact with any debugging facilities that exist. The resulting object can be cast back to a DebuggableEnumerable<T> to inspect the expression tree, render the expression tree on a user interface and so on. These interactions can be triggered by the user or can be provided through tools.

Existing interfaces such as the IQueryable<T>and IObservable<T>interfaces can be used to add instrumentation. Because "local" query expressions in the form of local intermediate language (IL) instructions can be involved, generating an expression tree from the query expression can be employed to add instrumentation before returning to the original execution mode, avoiding interpretation in some other query language domain. For example, a local sequence (e.g., an IEnumerable<T>) can be converted into a variant (e.g., an IQueryable<T>), allowing an expression tree to be captured for debuggers and others tools to operate on. Finally, this form can be converted back to the local mode thusly:

In accordance with aspects of the subject matter disclosed herein, an extension method (e.g., called AsDebuggable) can capture an expression tree from a query and can add debugging capabilities. In particular, the runtime return type is a subtype of IQueryable<T>, exposing debugging APIs:

```
var res=(from x in xs.AsDebuggable( ) from y in ys
    where x>y select x+y);
```

Because each IDebuggableQueryable<T>wilt also be IEnumerable<T>explicit use of AsEnumerable is not needed. This is also true for the IObservable variants. AsQueryable (or AsObservable) calls can be placed in various places to capture an expression tree for a query involving multiple sources. For example, when using a concatenation operator (e.g., Concat), in a computation such as:

```
var res=(from x in xs.AsDebuggable( ) where x>0
    select x+1).Concat(from y in ys where y<0 select
    x-1);
``` an AsDebuggable call can be made on to debug and visualize the whole query expression. A rewritten expression tree can have nodes (e.g., such as but not limited to MethodCallExpression nodes) to various helper methods. In the event that the helper methods are unknown to the Queryable and Observable compilation infrastructure (which gets triggered upon execution of the query expression) a compilation mechanism for instrumented query expression trees can be provided by the debugger facilities.

At 204 a data structure such as an expression tree representing a computation such as a database query expression can be received by a graph generating module. The computation-representing data structure (e.g., expression tree) generated from the computation (e.g., query expression) can be converted into a graph. Nodes in the graph can correspond to intermediate sequences produced by execution of the database query expression. Edges can represent query operators.

Figure 2C:
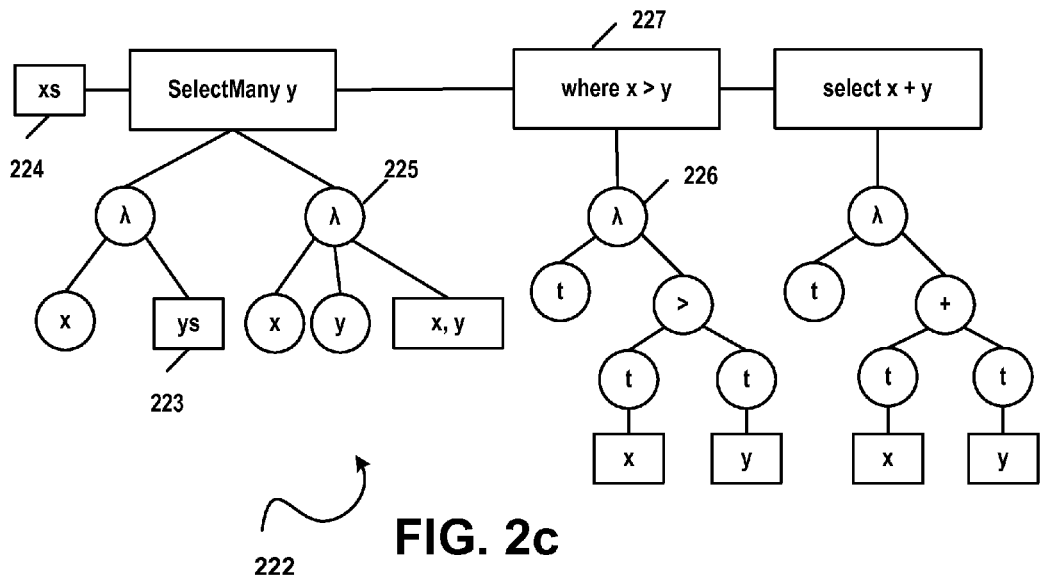
FIG. 2c illustrates an example of a query graph 222 for the query expression of FIG. 2b in accordance with aspects of the subject matter disclosed herein.

FIG. 2c illustrates an example of a graph layout 222 for the database query expression represented by the expression tree 220 of FIG. 2b. The query var res=Debug.Query(( )=> from x in xs from y in ys where x>y select x+y); includes multiple source nodes (e.g., source nodes 223, 224, etc.). The source nodes can come from one or more expression tree node types, such as a constant expression (e.g., ConstantExpression, for instance an array declaration acting as the input to AsDebuggable), a member expression (e.g., MemberExpression that gets a collection front a context object, for instance to retrieve a table from a database context), a method call expression (e.g., MethodCallExpression where the left-hand side of the call is not a sequence by itself, for instance to execute a parameterized stored procedure on a database context). Sources are indicated using a square box in the diagrams represented in the Figures but it will appreciated that any shape can be used to represent a source. Nodes in graph layout 222 can correspond to intermediate sequences (e.g., intermediate sequence nodes 225 and 226) produced by execution of the database query expression. Edges (e.g., edge 227) can represent query operators. A name given to a node can be derived from a string representation of the operation that precedes the node (e.g., the ToString representation of the operation preceding the node). In the Figures, the name of the node (e.g., node 227) can be abbreviated for clarity. For example for a WHERE operation, the string representation of the filter expression (e.g. x>y) can be dumped. Another example is the elimination of intermediate object allocations (such as transparent identifiers) so that the visualization can be as close as possible to what the user wrote.

Figure 2D:
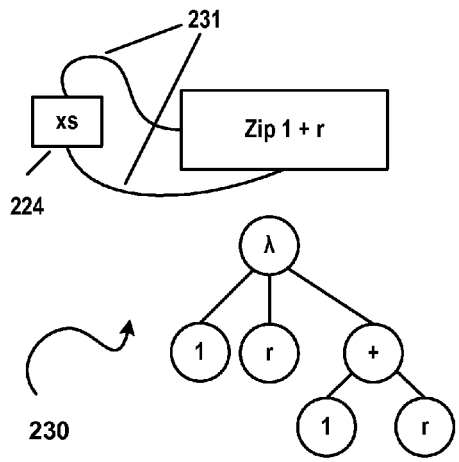
FIG. 2d illustrates an example of a query graph 230 in which a particular source result is used multiple times in the same graph in accordance with aspects of the subject matter disclosed herein.

FIG. 2d is an illustration of an example 230 of a visualization of a query expression in which a source (e.g., source 224) is used multiple times, represented in FIG. 2d by multiple lines 231.

Figure 2E:
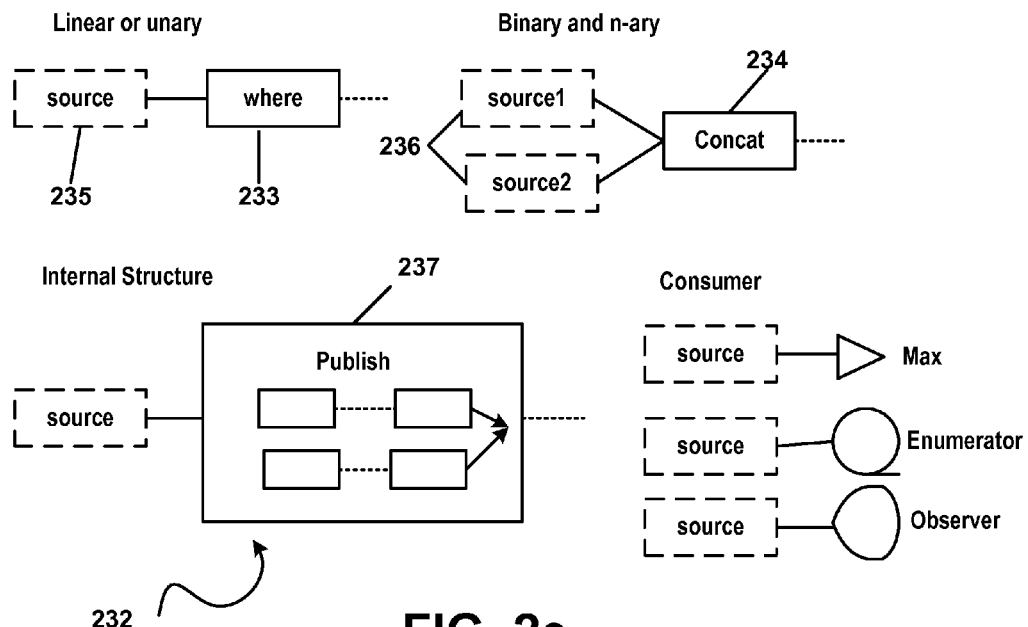
FIG. 2e illustrates an example of a query graph 232 in which different operators are represented in accordance with aspects of the subject matter disclosed herein.

Graph reconstruction can proceed by depth-first traversal of the expression tree. In accordance with aspects of the subject matter disclosed herein, for each identified source, a new source node can be constructed. Different kinds of query operators can be detected and can determine the shape of the graph created. FIG. 2e is an example 232 of representations of operator types. For example, detection of a linear operator having a single source input (e.g., source 235 including but not limited to Where and Select can result in the creation of a new node 233 representing the operation that can be connected to the node on the left-hand side using an edge containing information about the operation. Detection of a binary operator, an operation having two inputs or sources, can be a binary operator such as but not limited to a concatenation operator (e.g., Concat 234) or a union operator (e.g., Union) can have two incoming edges, one for each of the sources (e.g., sources 236) that are input. It will be appreciated that each of the binary operators can also be recursively converted into a graph. Similarly, detection of an operator with more than two inputs (e.g., concatenation of multiple sources n) can have n incoming edges.

Operators with internal structure (e.g., operators having one input but multiple outputs such as a publication operator 237) can have one incoming edge which is shared with multiple users before exposing a result as an outgoing edge. A one-to-many relationship can be represented by a lambda expression from which is generated a graph within the node for the operator. A select many operator (e.g., SelectMany) similarly can have a lambda that produces an IEnumerable<R>.

Consumers at the end of a query expression graph or blocking operations (such as LINQ to Objects blocking aggregates) can have a single input channel and no further output channel unless another instrumentor for that particular type is attached At 206 the expression tree generated from 202 can be instrumented so that lifecycle events can be monitored. For example, the timing of when an operator asks its source or sources for an enumerator can be recorded. Similarly the Subscribe method can be used for push-based systems. For example, consider a query expression that consists of a source, a WHERE filter, and a SELECT clause for projection into results, e.g.:

from p in products where p.Price>100 select p.Name

During execution of the query, each operator goes through several phases. First, the consumer of the query (e.g., a user interface that shows the results of execution of the query on a display), asks the SELECT operator to hand out a cursor to iterate over the results. This is the GetEnumerator stage. In this sample, this request is propagated from the SELECT operator to its own source, in this case the result of the preceding WHERE operator, again by a call to GetEnumerator. Finally, the WHERE operator does the same by propagating the request for a cursor (enumerator) to its source, the "products" object. After this initial phase, results can start to flow through the edges of the query graph. For example, the UI asking for the next element (by consulting the enumerator object it retrieved in the previous phase) causes a MoveNext call to arrive with the SELECT operator's enumerator. That one needs to get a value from the preceding WHERE operator, which in turn may involve retrieving one or more elements from the "products" source (until the condition of the WHERE filter holds). This too can be visualized by monitoring calls to MoveNext (or OnNext in the push-based world).

Other data flow operations that can be monitored include OnError (equivalent of MoveNext throwing an exception) and OnCompleted (equivalent of MoveNext returning false). Finally, when the consumer has seen all results of the query or when the consumer wants to abort the retrieval of data, a Dispose call can be issued on the cursor object (the enumerator) or the subscription (retrieved from Subscribe). Again, this message flows through the graph of connected query operators, and this flow can be monitored.

Figure 2F:
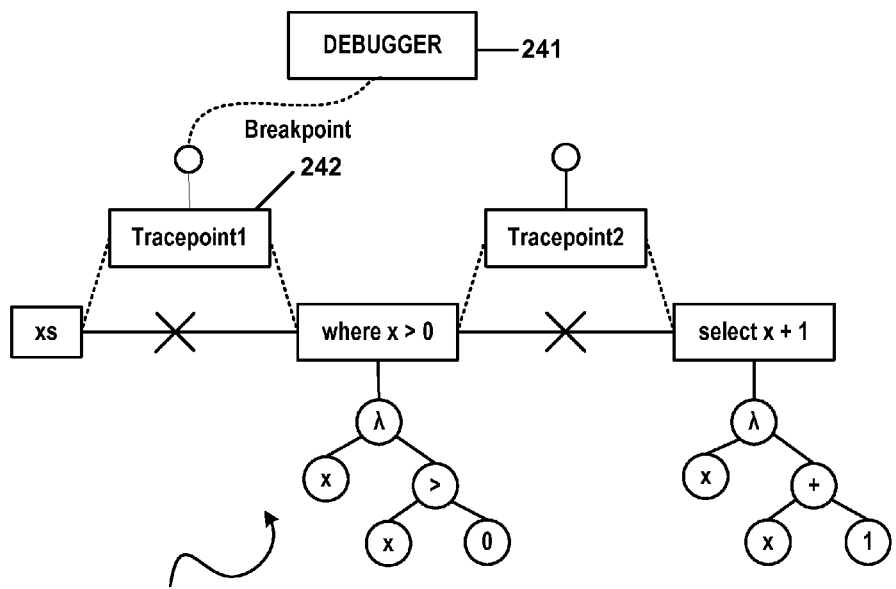
FIG. 2f illustrates an example of instrumentation of a query graph 240 in accordance with aspects of the subject matter disclosed herein.

FIG. 2f illustrates an example 240 of instrumentation of a query graph for the query from x in new[ ] {−1, 1} <source> where x>0
<where> select x+1 <select>

As used herein, instrumentation can comprise rewriting an expression tree with additional nodes to facilitate debuggers, visualizers, tracers, and so on. In accordance with aspects of the subject matter disclosed herein, an additional operator can be appended to the node or nodes to which an incoming edge is connected, whenever an edge is generated. The instrumentation can use the IObservable<T> interface to allow other parties (such as a debugger such as debugger 241) to connect to the trace point (e.g., trace point 242) using for example, a subscription method such as Subscribe.

The element type for the exposed observable sequence can be a wrapper at includes event notification messages including but not limited to the following:

GetEnumerator/Subscribe message received by the When an event that gets an enumerator such as GetEnurnerator is generated, a subscribe message can be sent to a consumer.

Dispose message received by the consumer (i.e. iteration or observation has stopped) When an iteration or observation has stopped, a dispose message can be generated and sent to a consumer.

---

MoveNext requested / OnNext fired )
Error occurred (~ OnError for IObservable sequences) and
Completion occurred (~ OnCompleted for IObservable sequences).

---

For example, consider the following query where trace points are indicated between operators:

from x in new[ ]{−1, 1} <source> where x>0 <where>
select x+1 <select>

On enumeration of this query (assuming an IEnumerable source), the following messages can be sent to the trace points:

---

<select> GetEnumerator (triggered by consumer starting iteration)
<select> MoveNext (triggered by consumer starting iteration)
   <where> GetEnumerator →<where>MoveNext → <source>
GetEnumerator → <source>MoveNext (cascade)
   <source> OnNext (−1) (does not pass where filter)
   <source> MoveNext (where asking for next element)
   <source> OnNext (1) → <where>OnNext (1) → <select>
OnNext(2) (did pass filter and went through projection)
   <select> MoveNext → <where>MoveNext → <source>
MoveNext (consumer asking for more results)
   <source> OnCompleted → <source> Disposed (where noticed end of source and calls Dispose)
   <where> OnCompleted → <where> Disposed (same as above, but now triggered by select)
   <select> OnCompleted → <select> Disposed (same as above, but now triggered by consumer).

In accordance with aspects of the subject matter disclosed herein, an IObservable<T> can be used for the observation of trace points. Alternatively, a trace point object can be used that enables modification of data flowing through the graph (e.g. to assist in "what if" debugging).

One contemplated instrumentor can cache sources to allow replay of input to enable historical debugging for example. Caching sources can be implemented by injecting a block that caches the input using an operator such as but not limited to MemoizeAll. When the query expression is re-enumerated, the source can be disabled and the cached data can be used instead. By using cached data, subsequent evaluation of the query expression will return the same results. For both enumerable and observable sequences, time (relative to the start of the enumeration or subscription) can be logged to replay the original data with equal distribution on the time axis, to assist in debugging a program error that is time-dependent. Alternatively, virtual time scheduling can be used to simulate the original timing during replay.

Another contemplated instrumentor can attach tracing information to objects flowing through the query. The tracing information can be used for trace debugging (e.g., to answer questions such as "How did this object end up in the output?"). Attaching tracing information to objects can be implemented by putting an additional block right after every source node. In accordance with aspects of the subject matter disclosed herein, a Select operator that projects the data of type T onto a Trace<T>.

Sample code implementing this follows.

```
abstract class Trace
{
  protected Trace(object value, Trace previous, Tracepoint trace)
  {
    Value = value;
    Origin = trace;
    Previous = previous;
  }
  public Tracepoint Origin { get; private set; }
  public Trace Previous { get; private set; }
  public object Value { get; private set; }
  public override string ToString()
  {
    return (Previous != null ? Previous.ToString() + " => " : "")
    + Origin + ":" + Value);
  }
}
class Trace<T>: Trace
{
  private Trace _previous;
  public Trace(T value, Tracepoint trace)
    : base(value, null, trace)
  {
  }
  private Trace(T value, Trace previous, Tracepoint trace)
    : base(value, previous, trace)
  {
  }
  public new T Value
  {
    get { return (T)_value; }
  }
  public Trace<R>Next<R>(R value, Tracepoint trace)
  {
    return new Trace<R>(value, this, trace);
  }
}
```

Every trace object can represent a trail to the source that originally gave rise to the object. Subsequent operators beyond the source can deconstruct and reconstruct trace objects to retain the original query behavior. For example:

```
xs.Where(x => x > 0)
→
xs.Select(x => new Trace<int>(x, tp_for_source)).Where(x => x.Value > 0)
```

An expression tree rewriter or instrumentor can unpack the contents of lambda expressions wherever needed. To append tracing information an additional Select operator can be attached to each operator as follows:

```
xs.Where(x => x > 0)
→
xs.Select(...).Where(x => x.Value > 0).Select(x => x.Next(x.Value, tp_generated_for_where))
```

Thus, when a traced object arrives at the consumer, its history can be inspected by following the trail of trace objects (e.g., using the Previous property), which can be exposed like a linked list. For some operators such as Publish, multiple trace objects can have the same Previous properly because the operator can replicate a single object to multiple consumers.

At 208 a query execution graph can be visualized. In accordance with aspects of the subject matter disclosed herein, a set of user interface elements with a layout isomorphic to the graph can be rendered. By connecting to particular trace point objects, nodes can be colored based on lifecycles. For example, one color (e.g., yellow) can indicate that the state of the data is at a "gel enumerator" stage, gray can indicate that the lifecycle is at a "move to the next one" stage, green can indicate completion and red can indicate that the data set can be disposed of. All objects flowing through an edge can be logged, for example in a watch window. Propagation of objects can be deferred because trace point callbacks are synchronous operations. The trace of an object can be highlighted in the graph or the track stack can be displayed. A user-defined action can be executed when the unpacked data is in scope (e.g., by requesting a $value for the value captured in an OnNext message).

Figure 2G:
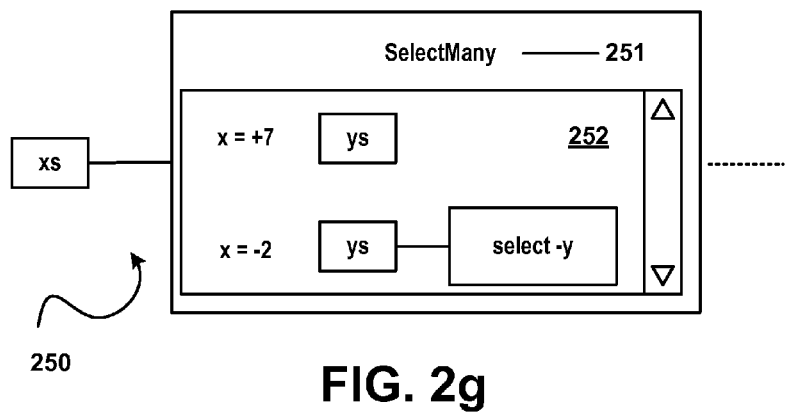
FIG. 2g illustrates an example of a visualization 250 illustrating inner sequences rendered as a scrollable list in accordance with aspects of the subject matter disclosed herein.

For complex operators in which many elements are selected e.g., such as but not limited to SelectMany) in which each outer sequence iteration yields anew inner sequence, a scrollable panel can be used to represent the multiple inner sequences that are being created. FIG. 2g visualization 250 illustrates such a scrollable panel 252 for a SelectMany operation 251. A traceback operation can flow through the original inner sequence, which can have a different shape from others. For example, in the query:

```
xs.SetectMany(x=>x>0? ys: ys.Select(y=>-y))
``` depending on the value of x, a different inner sequence can be returned. Since the lambda expression x=>x>0 ? can be analyzed in its entirety by the instrumentor, the above can be visualized appropriately in a dynamic manner. The inner sequences can be tagged with an identifier and the debugger can be notified about the execution of the lambda body as follows:

```
xs.SelectMany(x => tp_for_SelectMany.EnterInner(x, x > 0 ? ys.Tag
(tp_..., id1) : ys.Select(y => -y).Tag(tp_..., id2)))
```

When the SelectMany operator invokes the lambda expression, the trace point can be notified about a new inner run.

Notification can trigger the visualizer to add a new row to a scrollable panel 252 for the new run. A method such as EnterInner can return its argument after having notified the appropriate trace point object. When the SelectMany operator iterates over the resulting sequence, the Tag operators can be invoked to tell the observer (e.g., debugger) which graph is activated. Then, the new row can be populated with the inner graph as shown in FIG. 2g.

Figure 2H:
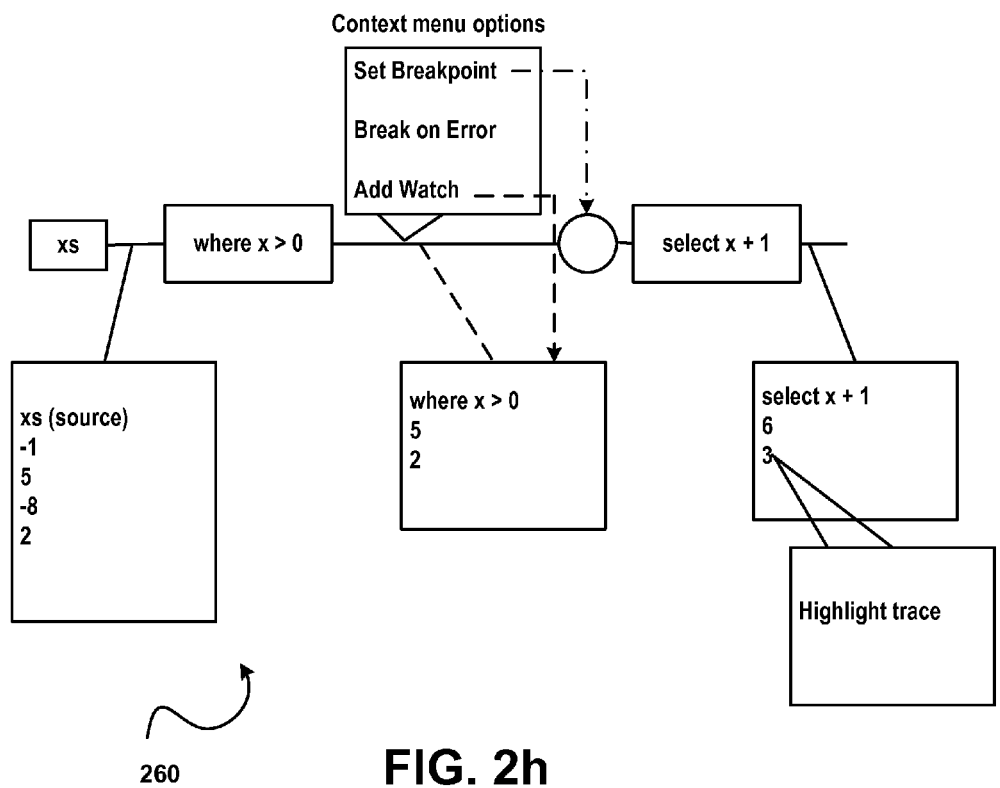
FIG. 2h illustrates an example of a visualization of debugging capabilities 260 in accordance with aspects of the subject matter disclosed herein.

Visualization can be enriched with additional abilities including but not limited to collapsing or hiding parts of a query. The same visualizer could be used to graphically construct queries as boxes- and lines-diagrams. FIG. 2h illustrates a graphical display 260 of some debugging facilities.

It will be appreciated that while discussed in the context of database query expression, the subject matter described herein can be implemented with respect other types of data flow networks. For example, fluent methods on string could be instrumented as illustrated below:

---

"Bart Simpson".Replace("Bart", "Lisa").Trim().ToUpper().
Substring(4, 3).ToLower()
→
"BartSimpson".Trace(tp1).Replace(...).Trace(tp2).Trim().Trace(tp3).
ToUpper().Trace(tp4).Substring(4, 3).Trace(tp5).ToLower()

---

Similarly for any block of code, tracing could be added after every statement, exposing the current scope's variables to the trace point connections, as illustrated below:

---

```
void Bar(int a)
{
    int b = int.Parse(Console.ReadLine());
    Trace(tp1, new { this, a, b });
    b += a;
    Trace(tp2, new { this, a, b });
    Console.WriteLine(b);
    Trace(tp3, new { this, a, b });
}
```

---

Example of a Suitable Computing Environment

Figure 3:
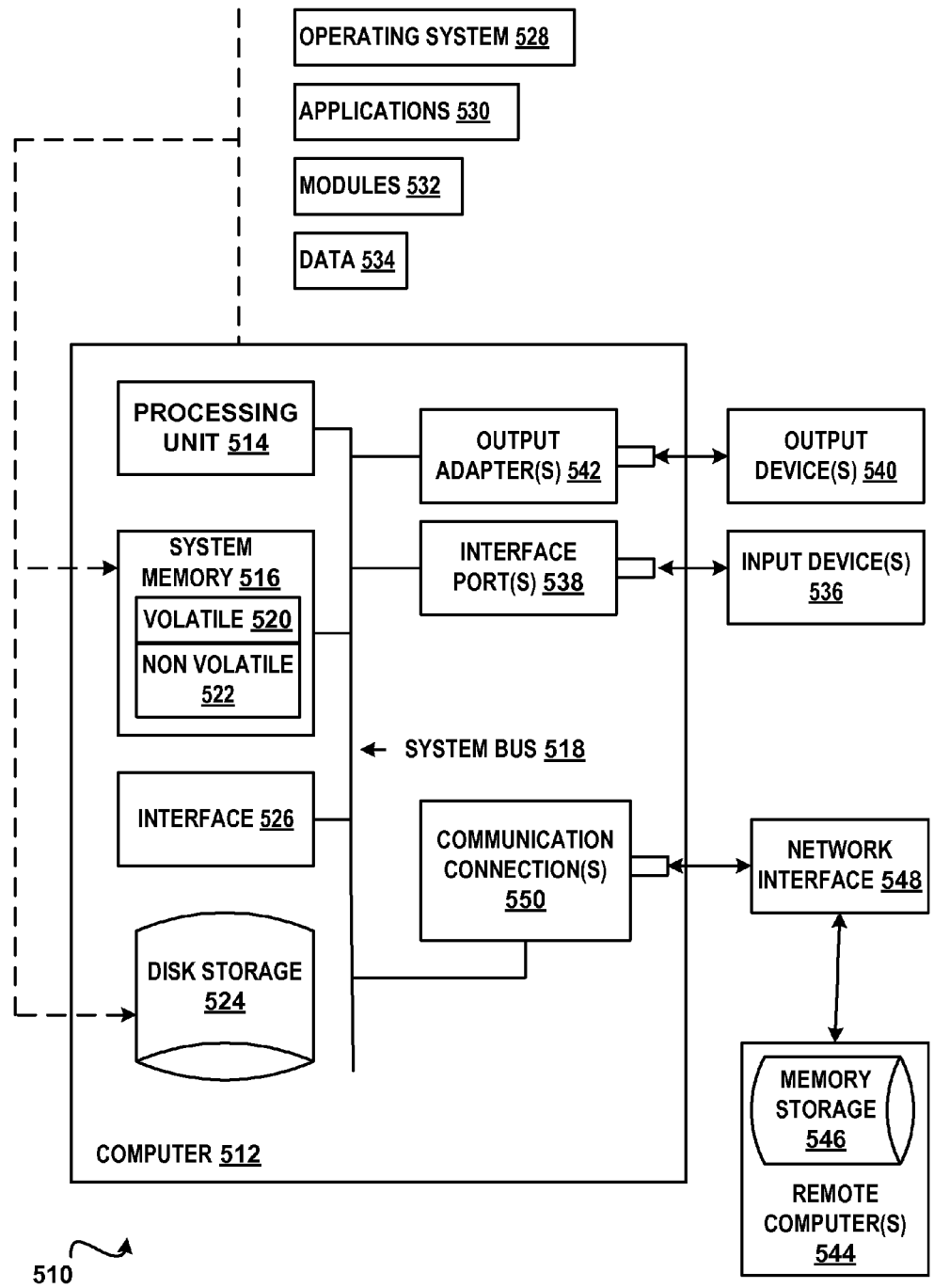
FIG. 3 is a block diagram of an example of a computing environment in accordance with aspects of the subject matter disclosed herein.

In order to provide context for various aspects of the subject matter disclosed herein, FIG. 3 and the following discussion are intended to provide a brief general description of a suitable computing environment 510 in which various embodiments of the subject matter disclosed herein may be implemented. While the subject matter disclosed herein is described in the general context of computer-executable instructions, such as program modules, executed by one or more computers or other computing devices, those skilled in the art will recognize that portions of the subject matter disclosed herein can also be implemented in combination with other program modules and/or a combination of hardware and software. Generally, program modules include routines, programs, objects, physical artifacts, data structures, etc. that perform particular tasks or implement particular data types. Typically, the functionality of the program modules may be combined or distributed as desired in various embodiments. The computing environment 510 is only one example of a suitable operating environment and is not intended to limit the scope of use or functionality of the subject matter disclosed herein.

With reference to FIG. 3, a computing device in the form of a computer 512 is described. Computer 512 may include at least one processing unit 514, a system memory 516, and a system bus 518. The at least one processing unit 514 can execute instructions that are stored in a memory such as but not limited to system memory 516. The processing unit 514 can be any of various available processors. For example, the processing unit 514 can be a GPU. The instructions can be instructions for implementing functionality carried out by one or more components or modules discussed above or instructions for implementing one or more of the methods described above. Dual microprocessors and other multiprocessor architectures also can be employed as the processing unit 514. The computer 512 may be used in a system that supports rendering graphics on a display screen. In another example, at least a portion of the computing device 512 can be used in a system that comprises a graphical processing unit. The system memory 516 may include volatile memory 520 and nonvolatile memory 522. Nonvolatile memory 522 can include read only memory (ROM), programmable ROM (PROM), electrically programmable ROM (EPROM) or flash memory. Volatile memory 520 may include random access memory (RAM) which may act as external cache memory. The system bus 518 couples system physical artifacts including the system memory 516 to the processing unit 514. The system bus 518 can be any of several types including a memory bus, memory controller, peripheral bus, external bus, or local bus and may use any variety of available bus architectures. Computer 512 may include a data store accessible by the processing unit 514 by way of the system bus 518. The data store may include executable instructions, 3D models, materials, textures and so on for graphics rendering.

Computer 512 typically includes a variety of computer readable media such as volatile and nonvolatile media, removable and non-removable media. Computer storage media may be implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 512

It will be appreciated that FIG. 3 describes software that can act as an intermediary between users and computer resources. This software may include an operating system 528 which can be stored on disk storage 524, and which can allocate resources of the computer 512. Disk storage 524 may be a hard disk drive connected to the system bus 518 through a non-removable memory interface such as interface 526. System applications 530 take advantage of the management of resources by operating system 528 through program modules 532 and program data 534 stored either in system memory 516 or on disk storage 524. It will be appreciated that computers can be implemented with various operating systems or combinations of operating systems.

A user can enter commands or information into the computer 512 through an input device(s) 536. Input devices 536 include but are not limited to a pointing device such as a mouse, trackball, stylus, touch pad, keyboard, microphone, and the like. These and other input devices connect to the processing unit 514 through the system bus 518 via interface port(s) 538. An interface port(s) 538 may represent a serial port, parallel port, universal serial bus (USB) and the like. Output devices(s) 540 may use the same type of ports as do the input devices. Output adapter 542 is provided to illustrate that there are some output devices 540 like monitors, speakers and printers that require particular adapters. Output adapters 542 include but are not limited to video and sound cards that provide a connection between the output device 540 and the system bus 518. Other devices and/or systems or devices such as remote computer(s) 544 may provide both input and output capabilities.

Computer 512 can operate in a networked environment using logical connections to one or more remote computers, such as a remote computer(s) 544. The remote computer 544 can be a personal computer, a server, a router, a network PC, a peer device or other common network node, and typically includes many or all of the elements described above relative to the computer 512, although only a memory storage device 546 has been illustrated in FIG. 3. Remote computer(s) 544 can be logically connected via communication connection(s) 550. Network interface 548 encompasses communication networks such as local area networks (LANs) and wide area networks (WANs) but may also include other networks. Communication connection(s) 550 refers to the hardware/software employed to connect the network interface 548 to the bus 518. Communication connection(s) 550 may be internal to or external to computer 512 and include internal and external technologies such as modems (telephone, cable, DSL and wireless) and ISDN adapters, Ethernet cards and so on.

It will be appreciated that the network connections shown are examples only and other means of establishing a communications link between the computers may be used. One of ordinary skill in the art can appreciate that a computer 512 or other client device can be deployed as part of a computer network. In this regard, the subject matter disclosed herein may pertain to any computer system having any number of memory or storage units, and any number of applications and processes occurring across any number of storage units or volumes. Aspects of the subject matter disclosed herein may apply to an environment with server computers and client computers deployed in a network environment, having remote or local storage. Aspects of the subject matter disclosed herein may also apply to a standalone computing device, having programming language functionality, interpretation and execution capabilities.

Figure 4:
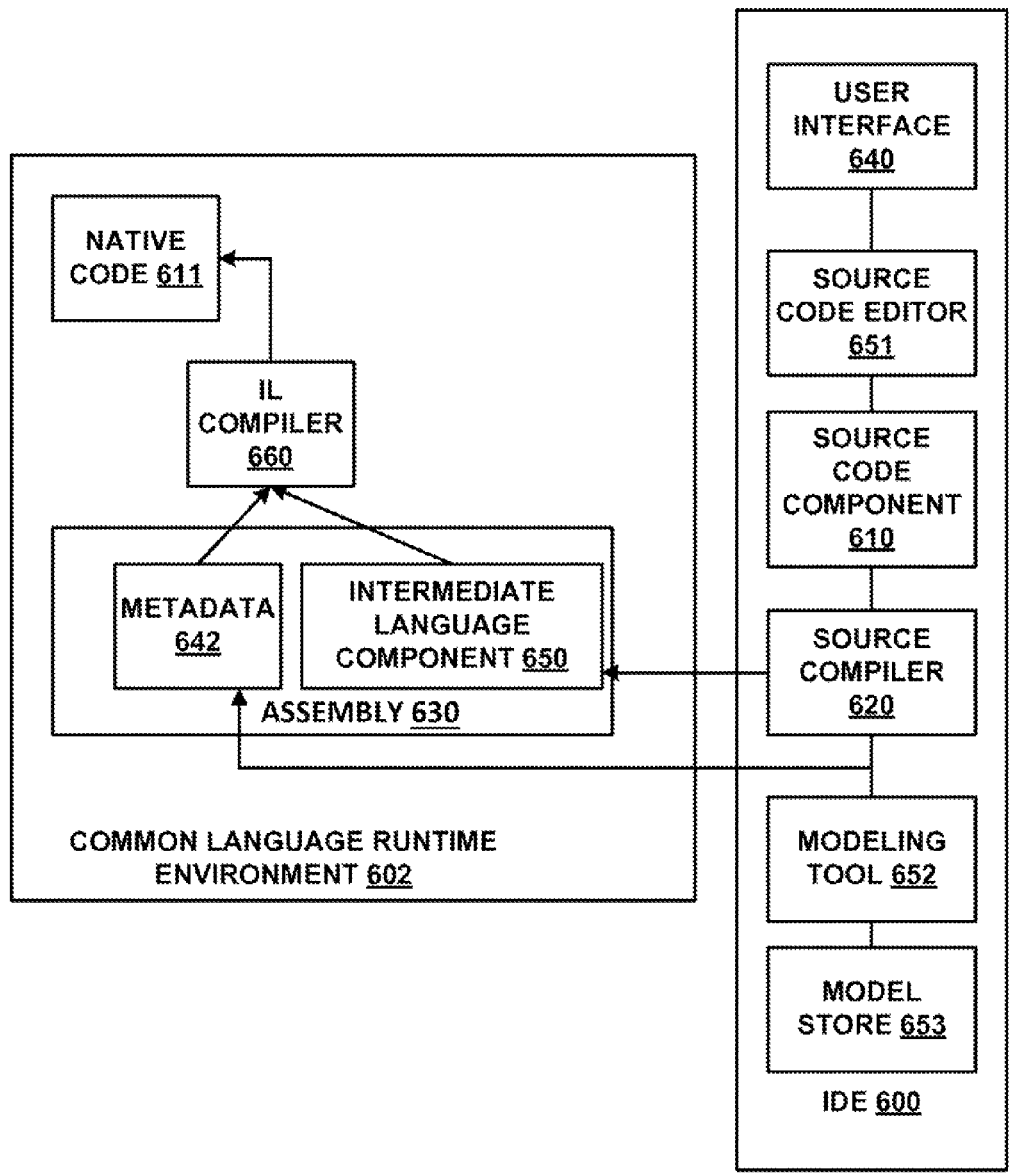
FIG. 4 is a block diagram of an example of an integrated development environment in accordance with aspects of the subject matter disclosed herein.

FIG. 4 illustrates an integrated development environment (IDE) 600 and Common Language Runtime Environment 602. An IDE 600 may allow a user (e.g., developer, programmer, designer, coder, etc.) to design, code, compile, test, run, edit, debug or build a program, set of programs, web sites, web applications, and web services in a computer system. Software programs can include source code (component 610), created in one or more source code languages (e.g., Visual Basic, Visual J#, C++, C#, J#, Java Script, APL, COBOL, Pascal, Eiffel, Haskell, ML, Oberon, Perl, Python, Scheme, Smalltalk and the like). The IDE 600 may provide a native code development environment or may provide a managed code development that runs on a virtual machine or may provide a combination thereof. The IDE 600 may provide a managed code development environment using the .NET framework. An intermediate language component 650 may be created from the source code component 610 and the native code component 611 using a language specific source compiler 620 and the native code component 611 (e.g., machine executable instructions) is created from the intermediate language component 650 using the intermediate language compiler 660 (e.g. just-in-time (JIT) compiler), when the application is executed. That is, when an IL application is executed, it is compiled while being executed into the appropriate machine language for the platform it is being executed on, thereby making code portable across several platforms. Alternatively, in other embodiments, programs may be compiled to native code machine language (not shown) appropriate for its intended platform.

A user can create and/or edit the source code component according to known software programming techniques and the specific logical and syntactical rules associated with a particular source language via a user interface 640 and a source code editor 651 in the IDE 600. Thereafter, the source code component 610 can be compiled via a source compiler 620, whereby an intermediate language representation of the program may be created, such as assembly 630. The assembly 630 may comprise the intermediate language component 650 and metadata 642. Application designs may be able to be validated before deployment.

The various techniques described herein may be implemented in connection with hardware or, software or, where appropriate, with a combination of both. Thus, the methods and apparatus described herein, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing aspects of the subject matter disclosed herein. As used herein, the term "machine-readable medium" shall be taken to exclude any mechanism that provides (i.e., stores and/or transmits) any form of propagated signals. In the case of program code execution on programmable computers, the computing device will generally include a processor, a storage medium readable by the processor (including volatile and non-volatile memory and/or storage elements), at least one input device, and at least one output device. One or more programs that may utilize the creation and/or implementation of domain-specific programming models aspects, e.g., through the use of a data processing API or the like, may be implemented in a high level procedural or object oriented programming language to communicate with a computer system. However, the program(s) can be implemented in assembly or machine language, if desired. In any case, the language may be a compiled or interpreted language, and combined with hardware implementations.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:
1. A system comprising:
   at least one processor of a computing device;
   a memory of the computing device; and
   at least one module loaded into the memory causing the at least one processor to:
   capture a computation in a data structure, the data structure comprising an expression tree;
   construct a graph from the data structure, the graph comprising nodes representing data and edges representing operators used in the computation;
   instrument the computation by adding code for a trace point, the trace point dispatching at least one notification to an observer, the dispatching of the at least one notification triggered by a specified event;
   visualize the computation during execution by mapping the graph onto a user interface representation; and
   trace flow of data through the computation by tagging the data with an identifier to determine at least one operator operating on the data.

2. The system of claim 1, further comprising:
at least one module loaded into the memory causing the at least one processor to:
cache the data by injecting code into the computation; and
rerun the computation using the cached data.

3. The system of claim 1, wherein:
the computation comprises a query operation.

4. The system of claim 1, wherein an execution plan graph is constructed from the expression tree with nodes of the execution plan graph representing intermediate sequences of data and edges of the execution plan graph representing operators used in the computation.

5. The system of claim 1, wherein the expression tree is instrumented with at least one trace point, the at least one trace point dispatching at least one notification, the dispatching of the at least one notification triggered by a specified event, the at least one notification dispatched to a debugger, the debugger executing a breakpoint, watch window, or execution visualizer, based on the at least one trace point associated with a particular user interface element.

6. The system of claim 5, wherein during execution of the instrumented expression tree, data is tagged with a trace identifier that identifies a source of the data or an operator that operates on the data.

7. A method comprising:
converting a programming language expression into an expression tree representing the programming language expression by a processor of a software development computer;
converting the expression tree into an execution plan graph, nodes of the execution plan graph representing intermediate sequences of data produced by execution of the programming language expression and edges of the execution plan graph representing execution operators executing on data input to the programming language expression;
instrumenting the expression tree by rewriting the expression tree with at least one additional node to connect to a debugger; and
displaying a visualization of an execution graph generated from the instrumented expression tree during execution of the programming language expression.

8. The method of claim 7, wherein the programming language expression comprises a query.

9. The method of claim 7, further comprising capturing the expression tree by inserting code into the programming language expression.

10. The method of claim 7, the visualization displaying at least one of a plurality of source nodes representing at least one of a plurality of expression tree nodes, the at least one expression tree node comprising a constant expression, a member expression, or a method call expression.

11. The method of claim 7, the visualization displaying a scrollable panel representing a plurality of inner sequences created during execution of the programming language expression.

12. The method of claim 11, wherein each of the plurality of inner sequences is tagged with an identifier that identifies an activated query execution graph.

13. The method of claim 7, further comprising attaching tracing information to an object flowing through the programming language expression, the tracing information used for trace debugging, attaching the tracing information by adding an operator to the execution plan graph.

14. A computer-readable storage medium, which is not a signal, comprising computer-executable instructions which when executed cause at least one processor of a computing device to:
convert a programming language expression into an expression tree representing the programming language expression;
convert the expression tree into an execution plan graph, nodes of the execution plan graph representing intermediate sequences of data produced by execution of the programming language expression and edges of the execution plan graph representing program operators executing on data input to the programming language expression;
instrumenting the expression tree by rewriting the expression tree adding code for a trace point, the trace point dispatching at least one notification to an observer, the dispatching of the at least one notification triggered by a specified event; and
displaying a visualization of an execution graph generated from the instrumented expression tree during execution of the programming language expression.

15. The computer-readable storage medium of claim 14, comprising further computer-executable instructions, which when executed cause at least one processor to:
cache data by injecting code into the programming language expression; and
rerun the programming language expression using the cached data.

16. The computer-readable storage medium of claim 15, comprising further computer-executable instructions, which when executed cause at least one processor to:
visualize execution of the programming language expression by mapping the execution graph onto a user interface representation.

17. The computer-readable storage medium of claim 14, comprising further computer-executable instructions, which when executed cause at least one processor to:
trace flow of data through the programming language expression by tagging the data with an identifier to determine at least one operator operating on the data or trace flow of data through the programming language expression by tagging the data with an identifier to determine a source of the data.

18. The computer-readable storage medium of claim 14, comprising further computer-executable instructions, which when executed cause at least one processor to:
receive a programming language expression comprising a query.

19. The computer-readable storage medium of claim 14, comprising further computer-executable instructions, which when executed cause at least one processor to:
attach tracing information to objects flowing through the programming language expression, the tracing information used for trace debugging, by adding an operator to the execution plan graph.

20. The computer-readable storage medium of claim 14, wherein the visualization includes at least one of a plurality of source nodes representing at least one of a plurality of expression tree nodes, the at least one of the plurality of expression tree nodes comprising at least one of a constant expression, a member expression, or a method call expression.

* * * * *